United States Patent [19]
Wu

[11] Patent Number: 5,896,282
[45] Date of Patent: Apr. 20, 1999

[54] INVERTER CIRCUIT AND INTEGRATED UNINTERRUPTIBLE POWER SUPPLY PROTECTION SYSTEM

[75] Inventor: Fu Ning Wu, Beijing, China

[73] Assignee: Amsdell Inc., Richmond Hill, Canada

[21] Appl. No.: 08/891,637

[22] Filed: Jul. 11, 1997

Related U.S. Application Data

[63] Continuation-in-part of application No. PCT/CA97/00185, Mar. 18, 1997.

[30] Foreign Application Priority Data

Mar. 21, 1996 [CN] China ............................. 96 2 045101
Jun. 20, 1997 [CA] Canada ............................. 2208380

[51] Int. Cl.$^6$ ............................. H02M 3/24; H02M 5/45
[52] U.S. Cl. ............................. 363/96; 363/37; 363/132; 363/97; 363/98
[58] Field of Search ............................. 363/96, 97, 49, 363/56, 136, 89; 323/901

[56] References Cited

U.S. PATENT DOCUMENTS

| | | | |
|---|---|---|---|
| 4,047,081 | 9/1977 | Liska | 318/138 |
| 4,204,265 | 5/1980 | McLeod | 363/71 |
| 4,208,711 | 6/1980 | Baker | 363/136 |
| 4,410,935 | 10/1983 | Dang | 363/37 |
| 4,445,049 | 4/1984 | Steigerwald | 307/45 |
| 4,612,611 | 9/1986 | Matthes et al. | 363/49 |
| 4,752,866 | 6/1988 | Huynh et al. | 363/138 |
| 4,945,465 | 7/1990 | Marinus et al. | 363/89 |

FOREIGN PATENT DOCUMENTS 2701339   8/1994   France.

Primary Examiner—Peter S. Wong
Assistant Examiner—Rajnikant B. Patel
Attorney, Agent, or Firm—Bereskin & Parr

[57] ABSTRACT

An uninterruptible power supply (UPS) system comprising an inverter for converting a DC voltage into an AC voltage comprising a full-bridge circuit having four silicon controlled rectifier (SCR) switches, two pulse control circuits for generating control voltage signals to turn on alternate pairs of said switches, a time sequencing circuit, and a power switch circuit. The full bridge circuit is directly connected to a positive DC input terminal and is coupled through the power switch circuit to a negative DC input terminal. The time sequencing circuit generates a first pulse signal for controlling the first pulse control circuit and a second pulse signal for controlling the second pulse control circuit so that the first pulse signal and the second pulse signal being in phase opposition. The time sequencing circuit further generates a third pulse signal for controlling the power switch circuit. The UPS inverter does not require an iron core transformer and so is of a size and weight which are compatible for use in small type UPS systems. Without sacrificing device size or safe and reliable operation, such a UPS system can be conveniently integrated physically with any standard power supply.

25 Claims, 13 Drawing Sheets

5,896,282

1

INVERTER CIRCUIT AND INTEGRATED UNINTERRUPTIBLE POWER SUPPLY PROTECTION SYSTEM

CONTINUATION-IN-PART STATUS

This application is a continuation-in-part of PCT patent application Ser. No. PCT/CA97/00185 filed Mar. 18, 1997 designating U.S.A. and entitled "Electrical Inverter with a Silicon Controlled Rectifier Full-Bridge Circuit".

FIELD OF THE INVENTION

The present invention relates to an inverter circuit for converting a DC voltage into an AC voltage, and also relates to an integrated UPS and power supply system, in which the UPS comprises an inverter circuit for converting a DC voltage into an AC voltage.

BACKGROUND OF THE INVENTION

Uninterruptible power supply (UPS) systems are commonly used for computers, fax machines, and other electronic devices. These systems provide protection against primary AC power failure and also against variations in power line frequency and voltage. There are generally three types of UPS systems: off-line or standby; line interactive; and on-line.

Off-line UPS systems do not regulate output voltage when the load is operating on utility power. As a result, off-line UPS systems are ineffective during power surges, spikes and brownouts, i.e. periods when a voltage reduction is initiated by a utility to counter excessive demand on its electric power generation and distribution system. In addition, when AC utility power is lost, an off-line UPS system requires a short transfer time before switching to battery power. These transfer times are typically several milliseconds, which makes off-line UPS devices unsuitable for use with sensitive equipment.

Line interactive UPS systems regulate voltage by adjusting the utility voltage before it passes to the load, and thus provide protection during brownouts and against power surges and spikes. However, these systems still exhibit transfer times of the order of a millisecond, and therefore are also unsuitable for use with sensitive equipment.

On-line UPS systems are connected between the power line and the load to provide for continuous voltage regulation and suppression of transients and noise. The transfer times for such systems are extremely small, and so they are suitable for very sensitive or highly critical equipment. In addition, on-line UPS systems provide for an improved and more efficient utilization of input utility power, and the improved power factor helps lower energy costs.

UPS systems, especially on-line systems, are particularly valuable with respect to computer systems since they provide users with data and equipment protection. A significant number of computer system breakdowns are caused by utility power failures and fluctuations, and this may require that expensive hardware be replaced and software reinstalled. Power problems also often lead to lockups, crashes, lost data, and faulty data transmissions. For instance, users need power protection to ensure that an electronic data transfer via the internet is properly completed, without any loss of data or sensitive information, even in the event of a power failure. A significant amount of time may be expended and business lost in attempting to recover from power disruptions. Computers also now perform multiple functions such as sending faxes and answering telephone calls, making the need for power protection even greater.

2

Also, although power grids used by businesses may be more reliable than power grids for residential purposes, more and more people have begun working out of their homes. In addition, utility power supply in developing nations can be very inconsistent, with disruptions often occurring several times a day.

Typically, a UPS system includes a storage battery, a battery charger, a switching circuit, and an inverter circuit which converts a DC voltage into an AC voltage. Conventional inverter circuits typically employ push-pull circuitry to alternately drive the two primary windings of a transformer and generate an alternating positive/negative or AC signal at the secondary windings of the transformer. This type of inverter is widely used in small and medium UPS systems (i.e. below 1 kVA (kilo-voltamperes)), as well as in other equipment which converts DC voltage to AC voltage. Although such inverters are simple and reliable, they typically require low frequency (10–100 Hz) iron core transformers which are large, heavy, and expensive.

As a result, UPS systems which incorporate these inverters are large, bulky, and generally unsuitable for use with personal computers, fax machines, and other equipment requiring small UPS systems. Thus, while computer network server computer systems are often protected by UPS technology, this is much more rarely the case for individually based computers, despite the significant benefits provided by UPS systems. Current UPS technology is also expensive, particularly for on-line UPS systems.

There is therefore a need for a novel inverter circuit which operates in a reliable and stable manner but does not require an iron core transformer, and which can consequently be incorporated into a UPS device which is significantly smaller in size, lighter in weight, and more cost efficient than conventional UPS devices. Such a UPS system would provide further practical benefits if it could be integrated with a conventional power supply for specific types of electronic equipment, such as a personal computer.

SUMMARY OF THE INVENTION

In one aspect, the present invention comprises an inverter circuit for converting a DC voltage between a first DC input and a second DC input into an AC voltage across a load, said load being coupled between a first output terminal and a second output terminal, characterized in that the inverter circuit comprises:

(a) a bridge circuit comprising a plurality of switches arranged in a bridge configuration, said bridge circuit being coupled between said first DC input and a first node, said bridge circuit further being coupled to said first output terminal and said second output terminal;

(b) a power switch circuit responsive to a third pulse signal and coupled between said first node and said second DC input;

(c) a first pulse control circuit responsive to a first pulse signal and coupled to said bridge circuit for turning on a first portion of said bridge circuit;

(d) a second pulse control circuit responsive to a second pulse signal and coupled to said bridge circuit for turning on a second portion of said bridge circuit; and (e) a timing circuit coupled to said first and second pulse control circuits and to said power switch circuit for generating said first pulse signal for controlling said first pulse control circuit, said second pulse signal for controlling said second pulse control circuit, said first pulse signal and said second pulse signal being in phase opposition, and said third pulse signal for controlling said power switch circuit.

In another aspect, the present invention comprises an inverter circuit for generating an AC voltage having a wave form of a certain shape, said inverter circuit converting a DC voltage between a first DC input and a second DC input into said AC voltage across a load, said load being coupled between a first output terminal and a second output terminal, characterized in that said inverter circuit comprises:

(a) a bridge circuit comprising a plurality of switches arranged in a bridge configuration, said bridge circuit being coupled between said first DC input and a first node, said bridge circuit further being coupled to said first output terminal and said second output terminal;

(b) a power switch circuit responsive to a third pulse signal and coupled between said first node and said second DC input;

(c) a first pulse control circuit responsive to a first pulse signal and coupled to said bridge circuit for turning on a first portion of said bridge circuit;

(d) a second pulse control circuit responsive to a second pulse signal and coupled to said bridge circuit for turning on a second portion of said bridge circuit;

(e) a timing circuit coupled to said first and second pulse control circuits and to said power switch circuit for generating said first pulse signal for controlling said first pulse control circuit, said second pulse signal for controlling said second pulse control circuit, said first pulse signal and said second pulse signal being in phase opposition, and said third pulse signal for controlling said power switch circuit;

(f) a circuit for providing a standard signal in the shape of said wave form.

(g) said inverter circuit being configured such that said first pulse signal pulses high and said second pulse signal remains low during the first half cycle of said standard signal; said second pulse signal pulses high and said first pulse signal remains low during the second half cycle of said standard signal; said third pulse signal pulses high if the value of said AC voltage is less than the value of said standard signal; and said third pulse signal remains low if the value of said AC voltage is greater than the value of said standard signal.

In a further aspect, the present invention comprises an integrated uninterruptible power supply (UPS) and power supply system for protecting a portable device from disruptions in utility AC power, said portable device having a power supply circuit installed thereon for receiving utility AC power, characterized in that said integrated UPS and power supply system comprises said power supply circuit and an uninterruptible power supply system circuit, said uninterruptible power supply system circuit comprising a battery and an inverter circuit, said inverter circuit not having an iron core transformer and being of small size. The integrated UPS and power supply system preferably comprises an inverter circuit in accordance with the present invention.

BRIEF DESCRIPTION OF THE DRAWINGS

In the accompanying drawings which illustrate preferred embodiments of the invention:

FIG. 8c illustrates the concept for generating the waveforms of FIG. 8a.

DETAILED DESCRIPTION OF THE INVENTION

Figure 1:
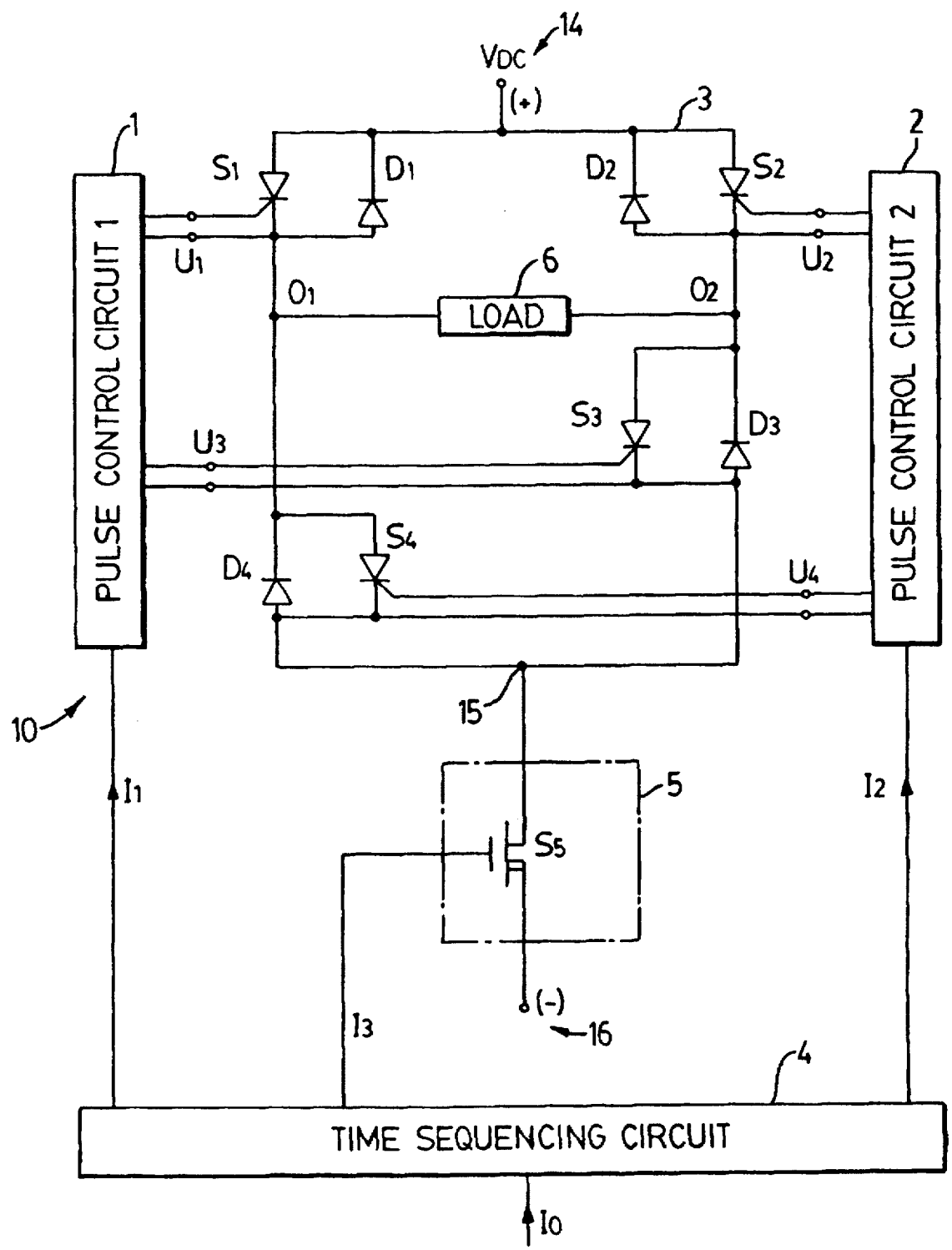
FIG. 1 shows an inverter circuit which can be incorporated in a UPS system in accordance with one embodiment of the present invention.

FIG. 1 shows an inverter 10 in accordance with one embodiment of the present invention. The inverter 10 may be used in a UPS system. Inverter 10 comprises a full-bridge circuit 3 having a plurality (i.e. four) silicon controlled rectifier switches, or SCRs, S1, S2, S3, and S4, two pulse control circuits labelled 1 and 2 respectively, a time sequencing circuit 4, and a power switch circuit 5. The full bridge circuit 3 is connected directly to a positive DC input terminal 14 and is coupled through the power switch circuit 5 to a negative DC input terminal 16. Referring to FIG. 1, rectifiers S1 and S4 are positively connected in series between the DC input 14 and node 15, so that the anode of S1 is coupled to the positive DC input 14 and the cathode of S4 is connected to node 15 and is thereby coupled, through power switch circuit 5, to the negative DC input 16. As shown in FIG. 1, rectifiers S2 and S3 are similarly connected and are in parallel with the series connection of S1 and S4. The AC output voltage of the inverter is generated between terminals O1 and O2. As shown in FIG. 1, an AC load 6 is coupled between the terminals O1 and O2. Output terminal O1 is coupled to the cathode of S1 and the anode of S4, and output terminal O2 is coupled to the cathode of S2 and the anode of S3. Diode D1 is connected in parallel with S1 so that the cathode of D1 is connected to the anode of S1 and the anode of D1 is connected to the cathode of S1. Diodes D2, D3, and D4 are similarly connected in parallel across rectifiers S2, S3, and S4 respectively, as shown in FIG. 1.

The gate and cathode of SCRs S1 and S3 are connected to differential control voltage signals U1 and U3 which are generated by Pulse Control Circuit 1. Similarly, the gate and cathode of SCRs S2 and S4 are connected to differential control voltage signals U2 and U4 which are generated by Pulse Control Circuit 2.

As shown in FIG. 1, Time Sequencing Circuit 4 outputs three time-sequencing pulse signals: I1, a first half-cycle time sequencing pulse which is the input to Pulse Control Circuit 1; I2, a second half-cycle time sequencing pulse which is the input to Pulse Control Circuit 2; and I3, a control time sequencing pulse which is the input to power switch circuit 5. In a preferred embodiment, I3 pulses low during the time between the first and second half-cycles (see FIG. 5 which will be described shortly and which shows waveforms for the signals I1, I2, and I3 according to this embodiment). In an alternate embodiment, I3 may pulse high or low depending on whether the output voltage signal is greater or less than a reference waveform voltage signal.

Figure 2:
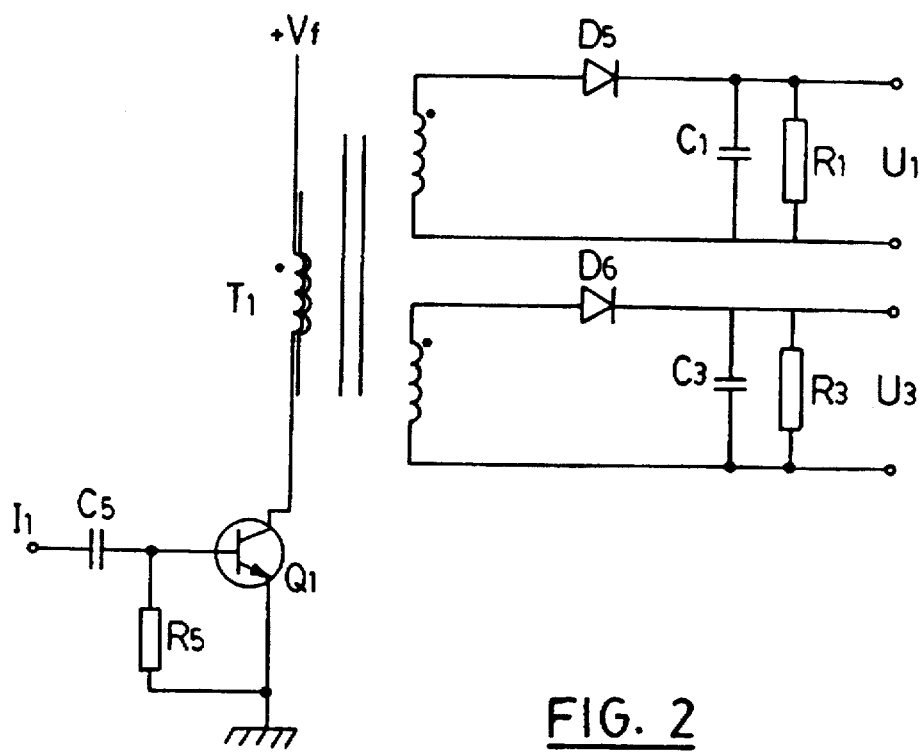
FIG. 2 shows one of the Pulse Control Circuits of FIG. 1.
Figure 3:
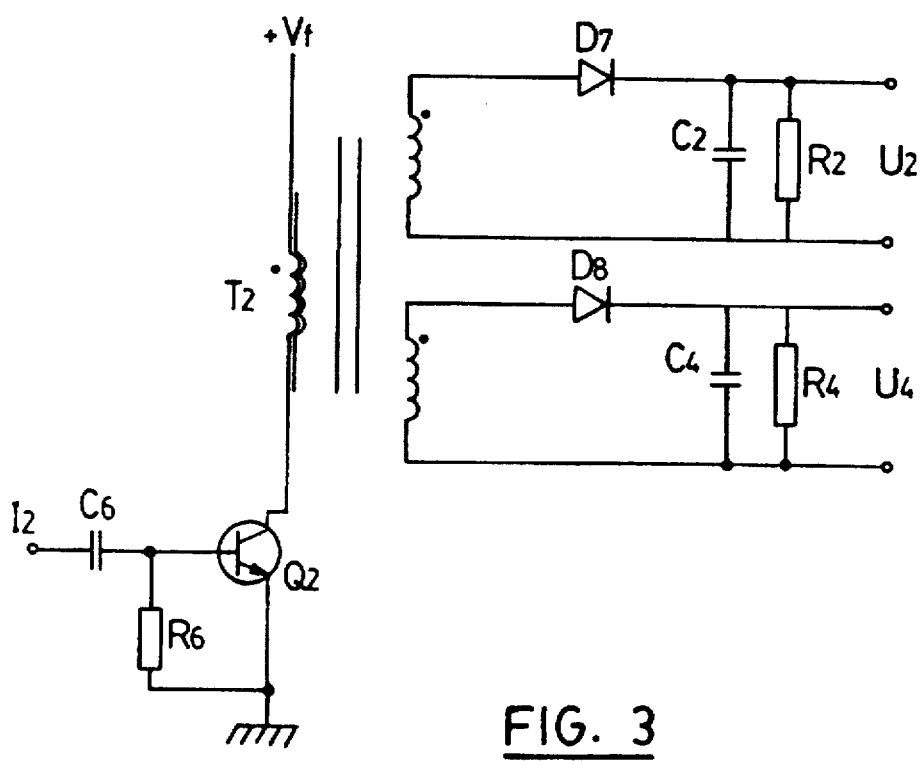
FIG. 3 shows the other of the Pulse Control Circuits of FIG. 1.

Preferred embodiments of the Pulse Control Circuits 1 and 2 are shown in FIGS. 2 and 3 respectively. Pulse Control Circuit 1 has two pairs of mutually isolated terminals to output the control pulse signals U1 and U3, and Pulse Control Circuit 2 has two pairs of mutually isolated terminals to output the control pulse signals U2 and U4.

Referring to FIG. 2, pulse transformer T1 has one primary winding and two secondary windings, with the polarity marked terminal of the primary winding connected to a reference voltage +Vf and the other terminal of the primary winding connected to the collector of transistor Q1. Note that transformer T1 need not comprise an iron core transformer. The emitter of transistor Q1 is connected to ground as is one terminal of resistor R5. The base of Q1 is connected to the other terminal of resistor R5 and to one terminal of capacitor C5. The other terminal of capacitor C5 is coupled to the input timing sequence pulse signal I1. Diode D5 is connected in series with the first secondary winding of transformer T1, and capacitor C1 and resistor R1 are each connected across the first secondary winding of transformer T1 in the manner shown in FIG. 2. Diode D6, capacitor C3, and resistor R3 are similarly connected to the second secondary winding of transformer T1. Control pulse signal U1 is output across the terminals of C1 and R1, and control pulse signal U3 is output across the terminals of C3 and R3.

The description of the configuration of Pulse Control Circuit 2 is the same as the above description for Pulse Control Circuit 1, with components C5, R5, Q1, T1, D5, C1, R1, D6, C3, and R3 correspondingly replaced by C6, R6, Q2, T2, D7, C2, R2, D8, C4, and R4 respectively.

As shown in FIG. 1, power switch circuit 5 may comprise one power field effect transistor S5, wherein the grid or gate of S5 receives the time sequencing pulse signal I3 and thereby controls whether the channel between the source and the drain of S5, i.e. the control path, is conducting.

Figure 4:
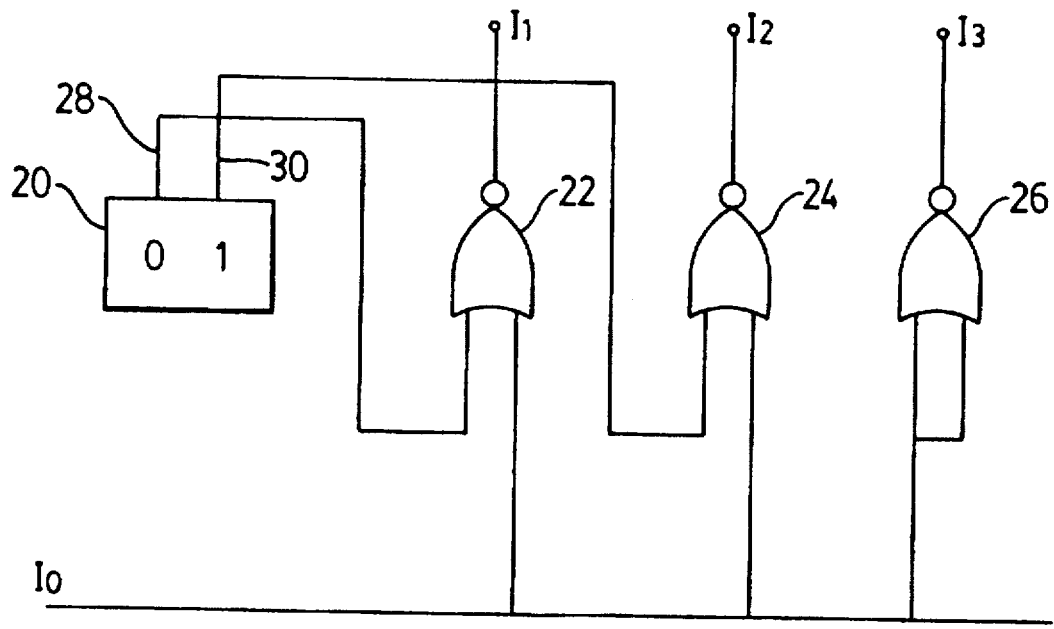
FIG. 4 shows a possible Time Sequencing Circuit for the inverter of FIG. 1.

FIG. 4 illustrates a possible embodiment for the Time Sequencing Circuit 4 and how time sequencing pulses I1, I2, and I3 may be generated in this embodiment from the signal I0 which acts as an input to the Time Sequencing Circuit 4. As will be explained below, the signals I1, I2, and I3 may also be generated by a programmable microprocessor. This could also be achieved by a pulse current supply (not shown) as will be clear to those skilled in the art. Referring to FIG. 4, circuit 20 generates complementary high/low signals 28 and 30 which are inverted (by conventional means not shown) every half cycle of I0. Circuit 20 may comprise a flip flop triggered by I0, or alternatively signals 28 and 30 may be generated by a programmable microprocessor. One of the signals, signal 28, from circuit 20 and the signal I0 are inputs to NOR gate 22 which outputs I1, and the other signal 30 from circuit 20 and the signal I0 are inputs to NOR gate 24 which outputs I2. As a result, signal I1 pulses high during the first half cycle of I0, i.e the time period of t1+t0, and signal I2 pulse high during the second half cycle of I0, i.e the time period of t2+t0 (note that t2=t1), so that signal I1 and signal I2 are in phase opposition (i.e. they are 180 degrees out of phase with each other) as shown in the timing diagram of FIG. 5. Referring to FIG. 4, NOR gate 26 acts as a digital inverter which inverts the input I0 to produce pulse signal I3.

In operation, during the onset of the first half cycle of I0 power transistor S5 is turned on by the rising edge of I3, and transistor Q1 is turned on by the rising edge of I1 and conducts until the voltage at the base of Q1 discharges, at a rate determined by R5 and C5, below the base-emitter threshold voltage. During the short time that Q1 is conducting, pulses are produced on each of the secondary windings of transformer T1 which charge C1 and C3 respectively through D5 and D6 respectively to a certain voltage. When U1 and U3 reach the trigger voltage necessary to turn S1 and S3 on, the output voltage across O1 and O2 becomes positive as shown for VO1O2 in FIG. 5. At the end of period t1, power transistor S5 shuts off and effectively cuts off the entire circuit, while diodes D5 and D6 reversibly isolate the bridge circuit from any back swing of transformer T1. Once cut off, the current flowing through rectifiers S1 and S3 rapidly decreases to a value below the minimum current necessary to maintain the SCRs in a conducting state, i.e. the holding current. Once S1 and S3 switch off, the output voltage across O1 and O2 goes to zero and remains at that value until the first half cycle of I0 ends. Note that to prevent S1 and S3 from possible damage, diodes D1 and D3 form a discharge loop in case an inductive load gives rise to an inductive current during cut off of the circuit.

The load 6 has a high impedance which maintains a stable current when either of the switching device pairs S1–S3 or S2–S4 are conducting. This current through the load is greater than the holding current, which is the minimum current required to maintain the conducting SCRs in a conducting state after they have been turned on.

Figure 5:
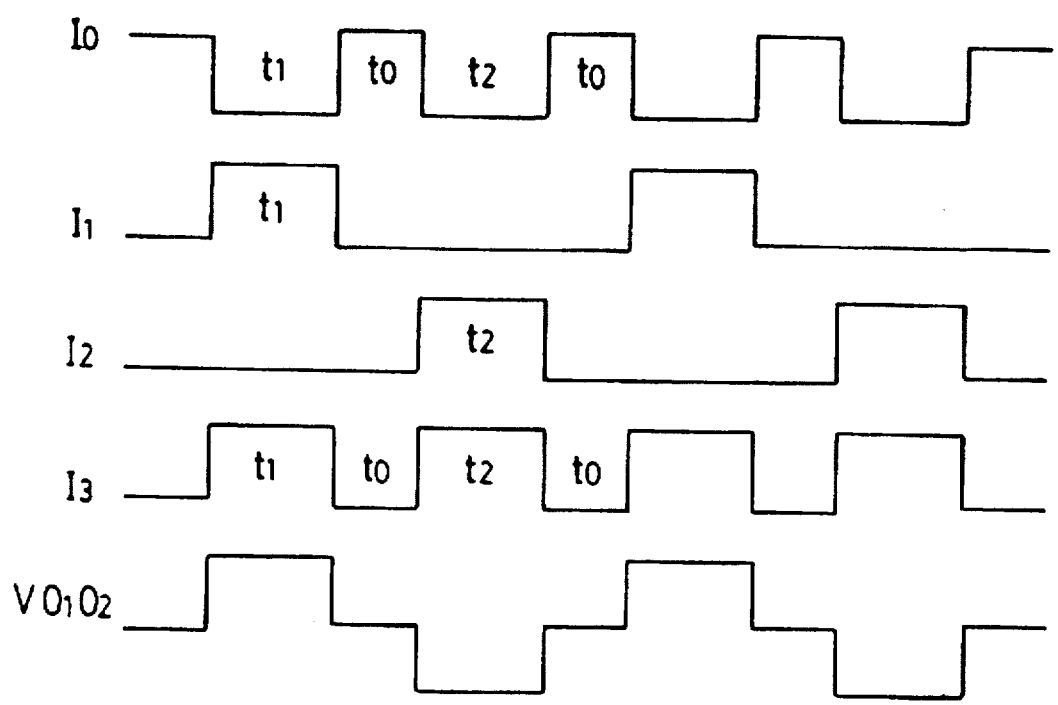
FIG. 5 is a timing diagram for the circuit of FIG. 4.

During the second half cycle of I0, power transistor S5 repeats the same turn on and cut off operation as just described for the first cycle, except in this case I2, and not I1, pulses high when I3 goes high. Control pulses U2 and U4 eventually reach a level which turns on rectifiers S2 and S4 (while S1 and S3 remain cut off). This causes the output voltage across O1 and O2 to become negative as shown for VO1O2 in FIG. 5, before it returns to zero when S2 and S4 turn off shortly after I2 and I3 go low. When I3 goes high again, so does I1, and the cycle repeats. As illustrated in FIG. 5, the output voltage, VO1O2, is a two step per half cycle AC voltage signal. As will be explained below, different output waveforms, such as a sine wave, may also be produced by the inverter.

Figure 6:
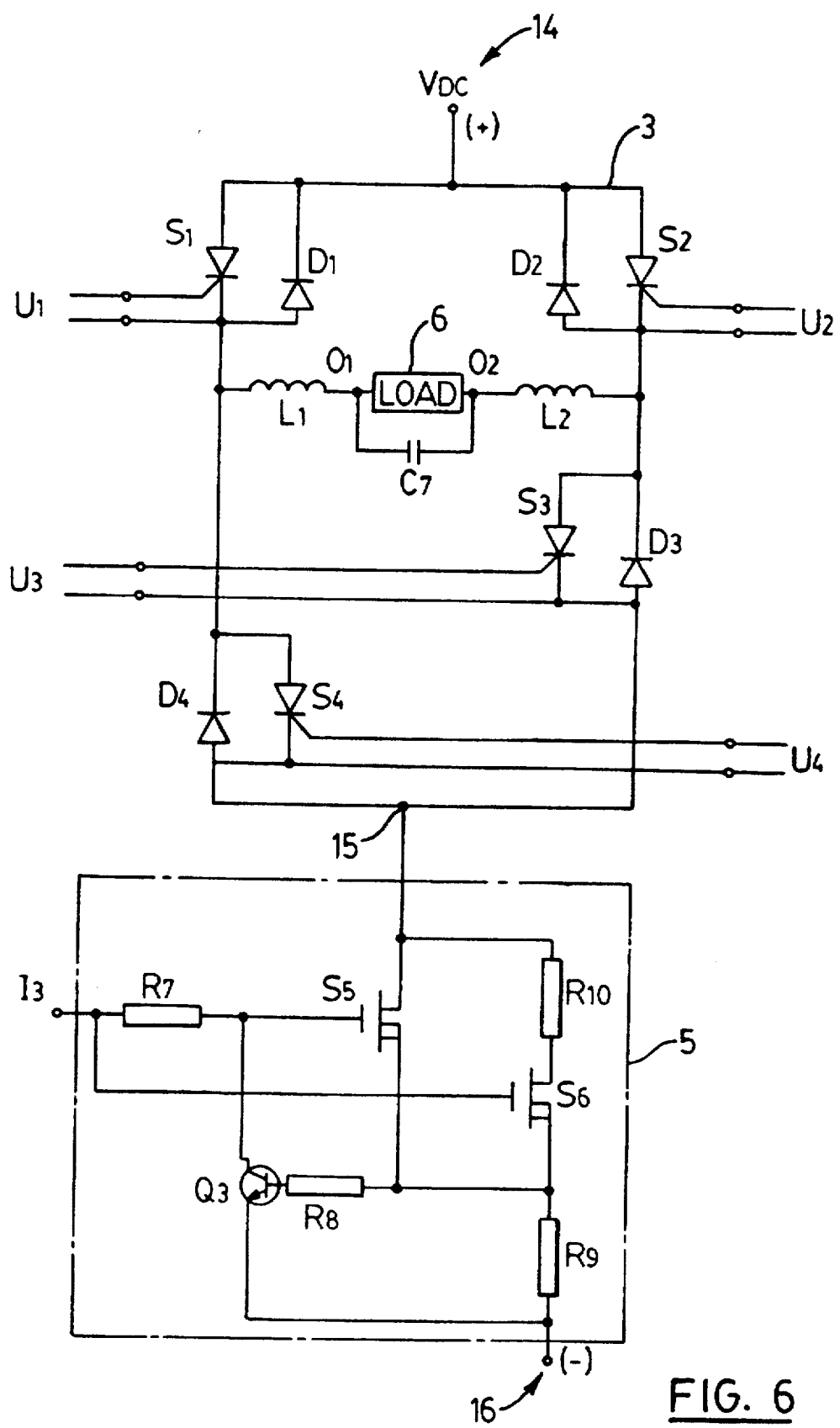
FIG. 6 illustrates an alternate embodiment of the inverter of FIG. 1.

In one embodiment of the present invention which is illustrated in FIG. 6, a filter capacitor C7 is connected between output terminals O1 and O2 so that it is effectively in parallel with the load 6. The output terminals O1 and O2 are additionally coupled to the series connected terminals of S1 and S4 and the series connected terminals of S2 and S3 through inductor L1 and inductor L2 respectively. Inductors L1 and L2 and capacitor C7 thereby comprise a filter circuit which increases the duration of the rise and fall times of the output signal, thereby inhibiting high frequency components during the rising and falling edges of the output signal and consequently reducing interference with the load. In addition, inductors L1 and L2 also serve to dampen the load current so that the circuitry can be protected.

Also in FIG. 6, an alternate embodiment of the power switch circuit 5 is shown comprising the power field effect transistor S5, a second power field effect transistor S6, current limiting resistor R10, over current detecting resistor R9, gate or grid control resistor R7, gate or grid control transistor Q3, and resistor R8. Referring to FIG. 6, R10 is connected between the drain terminals of S5 and S6. The source of S6 is connected to a first terminal of R8 and a first terminal of R9, while the second terminal of R9 is connected to the negative DC voltage 16. The first terminal of R8 is also connected to the source of S5 (so that the source of S5 is connected to the source of S6) and the second terminal of R8 is connected to the base of Q3. The emitter of Q3 is connected to the negative DC voltage 16 and the collector of Q3 is connected to the gate of S5 and a first terminal of R7. The input I3 is coupled to the second terminal of R7 as well as directly to the gate of S6. In this manner, the combination of R10, S6, and R9 form a control loop or control path for the power switch circuit 5.

In operation, the rising edge of the input pulse signal I3 simultaneously turns on power transistors S5 and S6. Resistor R9 samples the magnitude of the load current, and when the load current reaches a certain threshold magnitude, the voltage drop across R9 turns transistor Q3 on, which lowers the gate potential of power transistor S5, and in turn quickly leads to S5 shutting off. With S5 cut off, the load current shifts to flow through power transistor S6, whereby it is limited by the value of resistor R10. The above described current limiting approach, which does not entirely cut off the current loop, ensures that maximum power can be outputted while still maintaining safe operation of the circuitry.

The above approach is particularly advantageous in the case of a large capacitive load (i.e. approximately 200–400 micro-Farads), such as with a rectifying circuit comprising a large capacitor and a rectifying diode (and which is commonly connected to the input terminal of the switch source for a microcomputer). At the rising edge of the output signal, a large load capacitance effectively acts as a shorted load as it begins to charge. The current limiting function of the power switch circuitry protects the load while the load capacitor charges with the maximum output current that ensures safety and protection. Once the load capacitance has charged to the operating potential, the load current becomes too small to maintain the current sampling voltage across R9 at a value great enough to keep Q3 on. As a result, power transistor S5 turns on. With S5 on, the power consumption or dissipation in the inverter circuit is principally due to the voltage drop across the conducting SCR pair (either S1-S3 or S2-S4) and the voltage drop across S5, thus providing a high power efficiency. At the falling edge of I3, transistors S5 and S6 are cut off, and the inductive load current (from L1 and L2) continues to flow towards S5 so that the drain voltage of S5 rises. Diodes D1, D2, D3, and D4 provide a discharge loop for this current so that the SCR switches are protected, and energy is returned to positive DC voltage 14.

Figure 7:
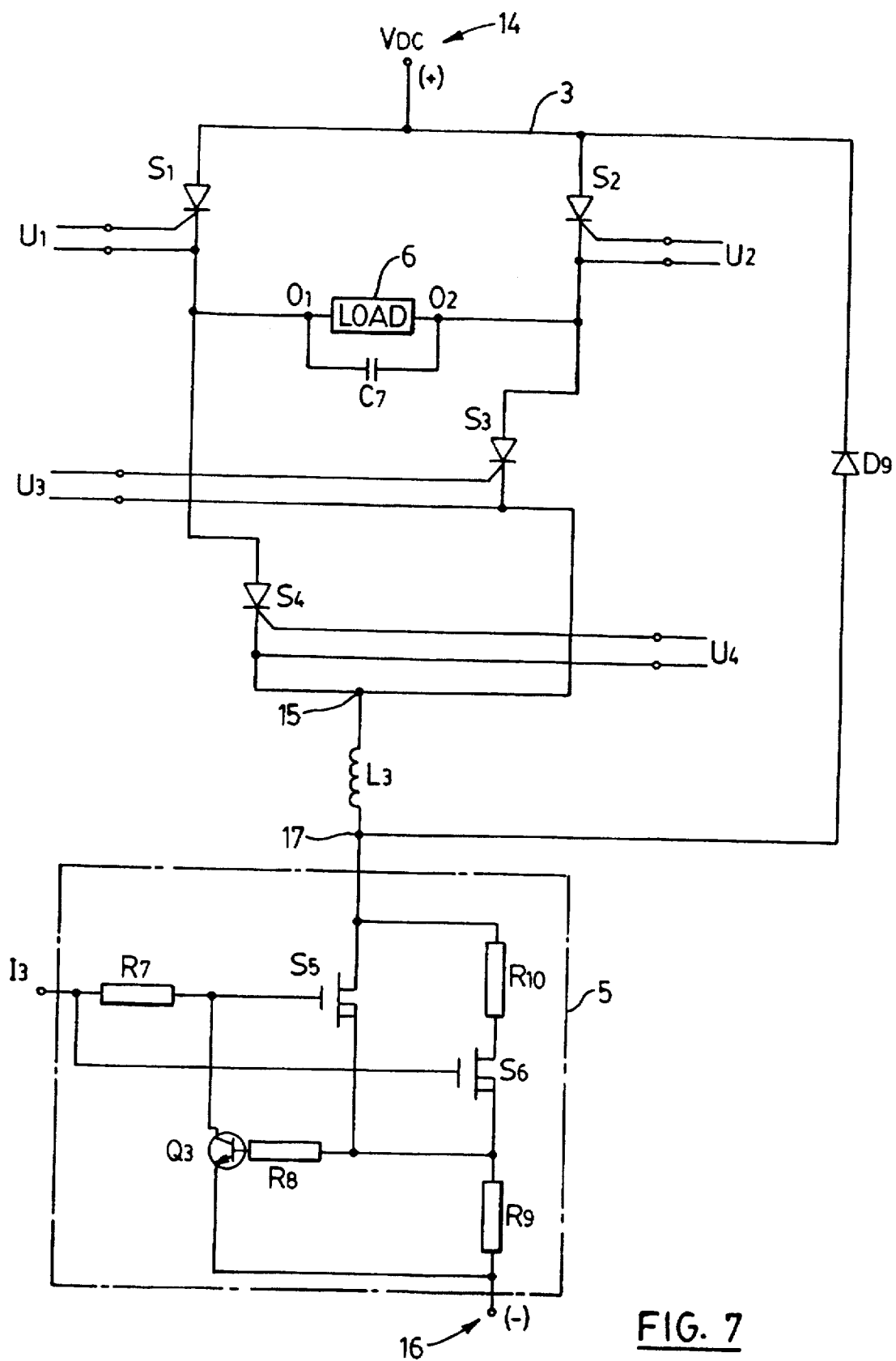
FIG. 7 illustrates a further alternate embodiment of the inverter of FIG. 6.

A further embodiment of the inverter circuit of the present invention is shown in FIG. 7. The inductors L1 and L2 of FIG. 6 are replaced by an inductor L3 which is connected between terminal 15 and the power switch circuit 5, as shown at terminal 17. In this embodiment, inductor L3 and capacitor C7 still comprise a filter circuit which increases the duration of the rise and fall times of the output signal, inhibiting high frequency components, and reducing interference with the load. Inductor L3 also serves to dampen the load current and thereby provide greater circuitry protection, as did inductors L1 and L2 in FIG. 6. However, inductor L3 also provides protection in case a short results from S1 and S4 simultaneously conducting or from S2 and S3 simultaneously conducting. Inductor L3 stops such a short current from increasing too rapidly, allowing (as explained above) the power switch circuit 5 to detect the high current, switch off transistor S5, and subsequently limit the current in the control path. Also in the embodiment of FIG. 7, diodes D1, D2, D3, and D4 are replaced by one feedback diode D9 which provides a discharge loop for a load current when the power switch is off.

It will be clear from the above description that the inverter circuit according to the present invention allows for the rise and fall times of the output waveform to be controlled. This can be accomplished by, for example, varying the value of R10 or C7 which together form a time constant for the output voltage signal. As already mentioned, longer transition times inhibit high frequency components, such as noise, and reduce interference with the load.

As previously mentioned, it is also possible for the inverter of the present invention to generate an output waveform which is a close approximation to a certain type of waveform, particularly a sine wave. Traditional methods of generating a sine wave output in a full-bridge inverter involve turning the four switches on and off at a high frequency. This operation is fairly complex and results in a high switching loss.

Figure 8A:
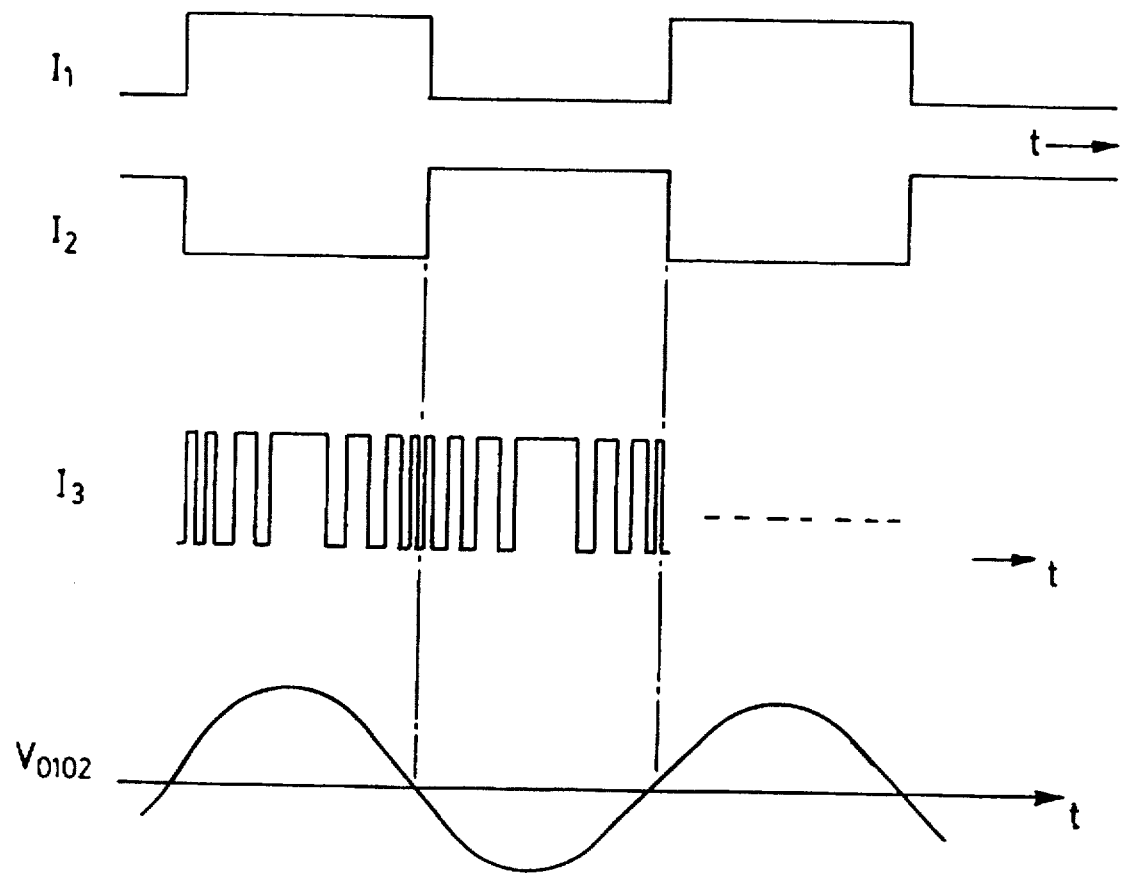
FIG. 8a and 8b illustrate waveforms for generating a sine wave output voltage.

By altering the signals from the Time Sequencing Circuit 4, the inverter according to the present invention can be used to produce a stepped or porch sine wave. In this aspect of the invention, the output voltage signal is continuously compared to a normalized or standard sine wave form signal of a certain frequency and amplitude. The I1 and I2 signals effectively pulse high during alternate half cycles of the standard wave signal: I1 pulses high and I2 remains low when the standard wave signal is positive and I2 pulses high and I1 remains low when the standard wave signal is negative (in practice there will be a very short time delay after one of these signals goes low before the other goes high). The I3 signal is essentially controlled by the principal of negative feedback. When the output voltage falls below the standard wave signal, I3 goes high turning on the power switch circuit 5 (and transistor S5). This causes the output voltage to increase, and approach the value of the standard wave signal. When the output voltage signal becomes higher than the standard signal, I3 goes low, and the output voltage decreases until it is again below the standard wave signal, and the process repeats. FIG. 8a illustrates the timing for the signals I1, I2, I3, and the output voltage signal VO1O2. As shown in FIG. 8a, the pulses of signal I3, which turn on the power switch 5, become narrower near the zero crossings and wider near the positive and negative peaks of the output signal.

Figure 8B:
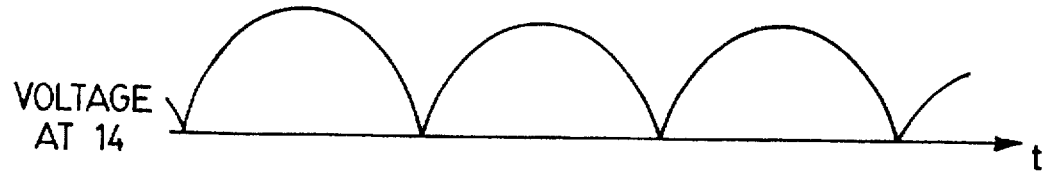
Figure 8C:
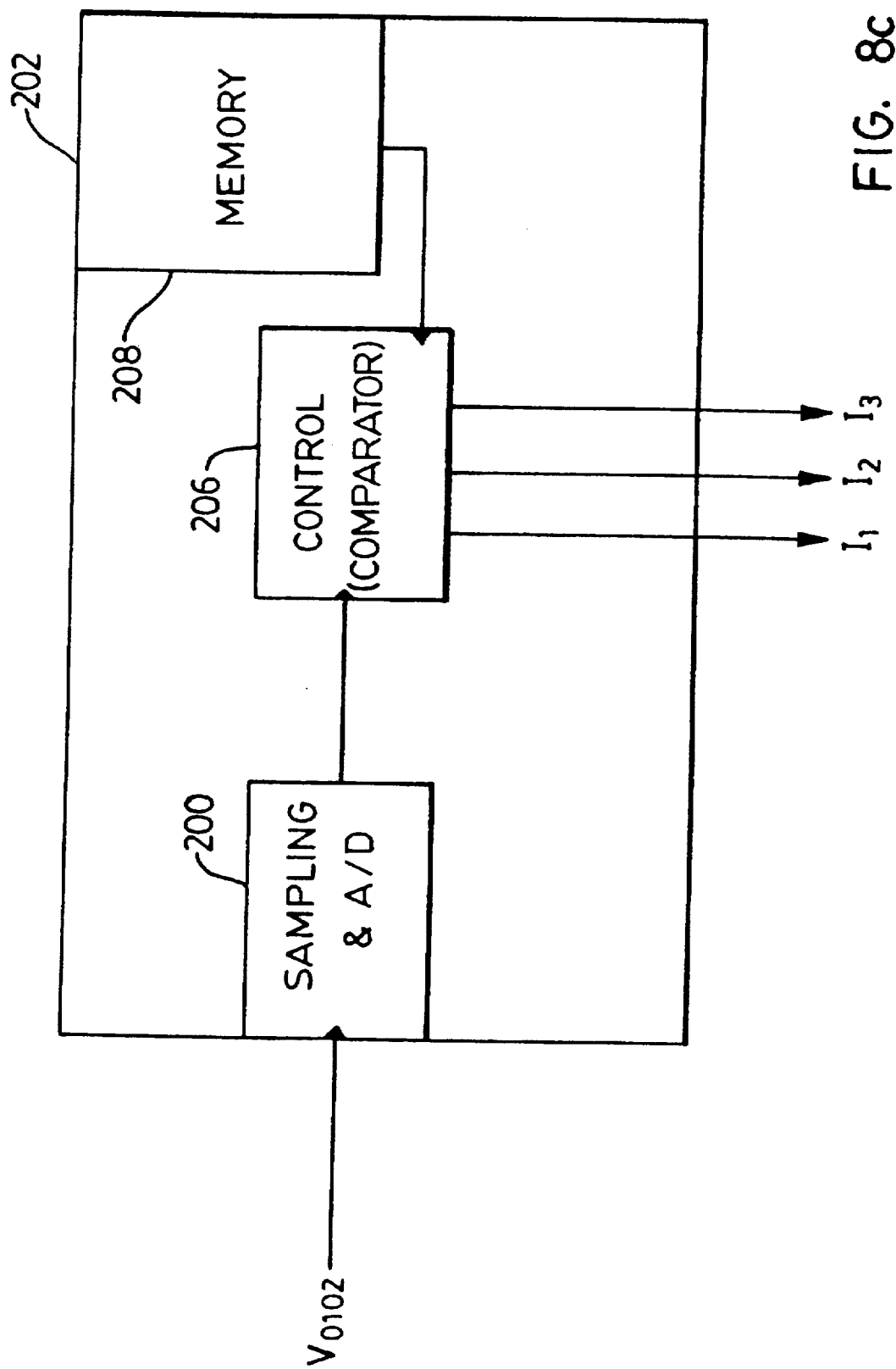

This method of output sine wave generation can be performed by a microprocessor which possesses an analog-to-digital (A/D) conversion function. FIG. 8c illustrates this concept generally. The output waveform can be sampled by a sampling circuit and A/D (conversion) port 200 in a microprocessor 202, and then compared by comparator function 206 to the numerical amplitude of the standard sine wave already stored in the microprocessor memory at 208. The microprocessor 202 (through control module 206) then generates the signals I1, I2, and I3 in response.

The present invention can also be applied to another method of generating a sine wave output voltage signal in which the inverter circuit no longer strictly converts a DC voltage to an AC voltage. In this embodiment, the voltage at terminal 14 of the inverter circuit (or alternatively at terminal 16) is not a DC signal but resembles a fully rectified half sine wave signal, as shown in FIG. 8b. The signal at terminal 16 (or alternatively at terminal 14) remains a DC signal, and preferably is at ground level. It is again necessary, in this embodiment, to compare the output voltage to a standard wave form signal. A high power converter which is controlled by a microprocessor generates the voltage signal at terminal 14. In a well known manner similar to that just described for the method illustrated by FIG. 8a, the output of the high power converter is altered, in response to the results of this comparison, to more closely resemble a half or rectified sine wave voltage signal. The signals I1, I2, and I3 may be generated as illustrated in FIG. 5, however t0, the time during which the power switch is shut off, is preferably very short in comparison with t1 and t2.

Note that both of these methods can be applied to generate signal waveforms of other shapes, for example triangular waves.

Figure 9A:
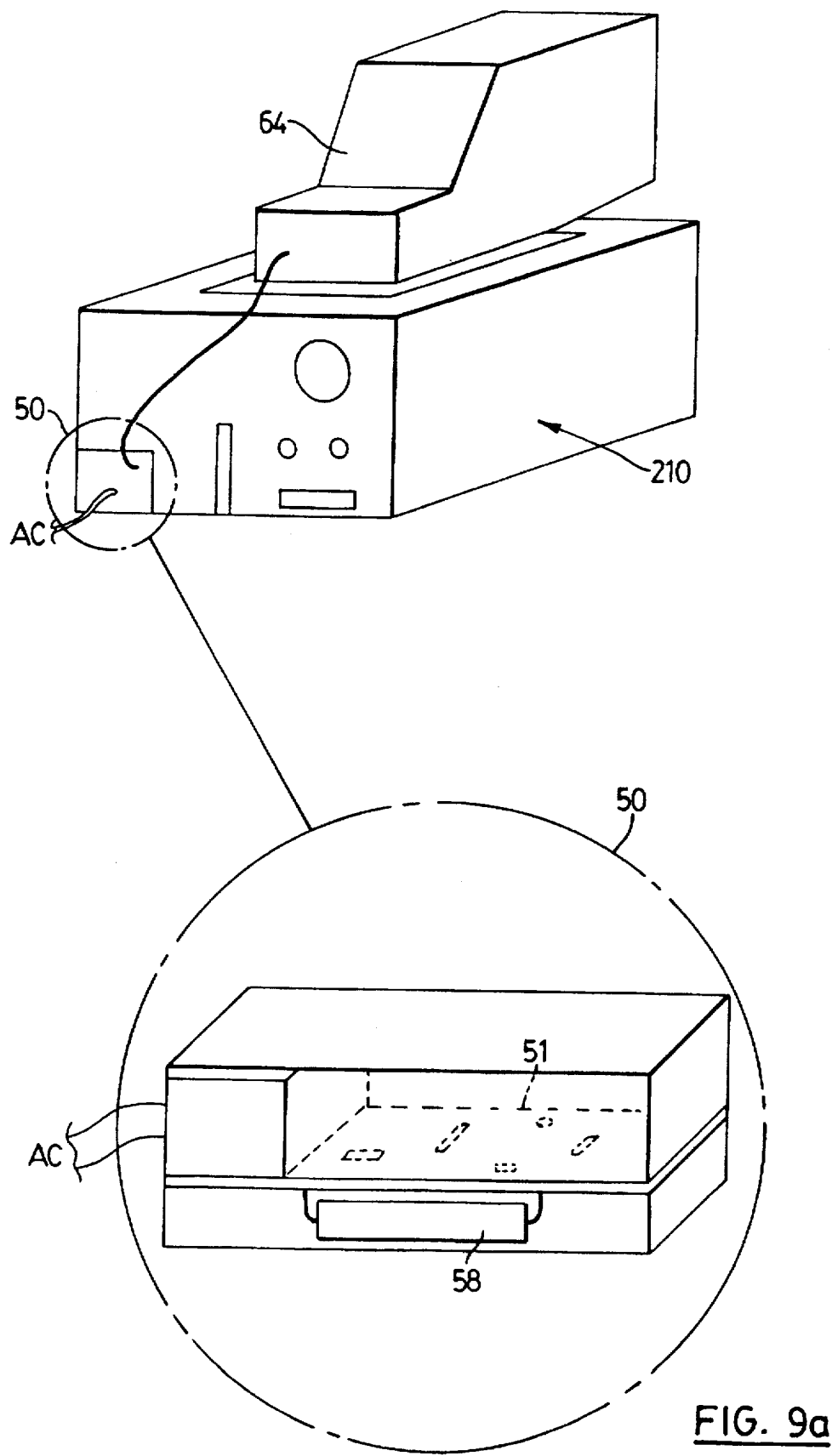
FIGS. 9a and 9b illustrate the basic concept of an integrated UPS and power supply system.
Figure 9B:
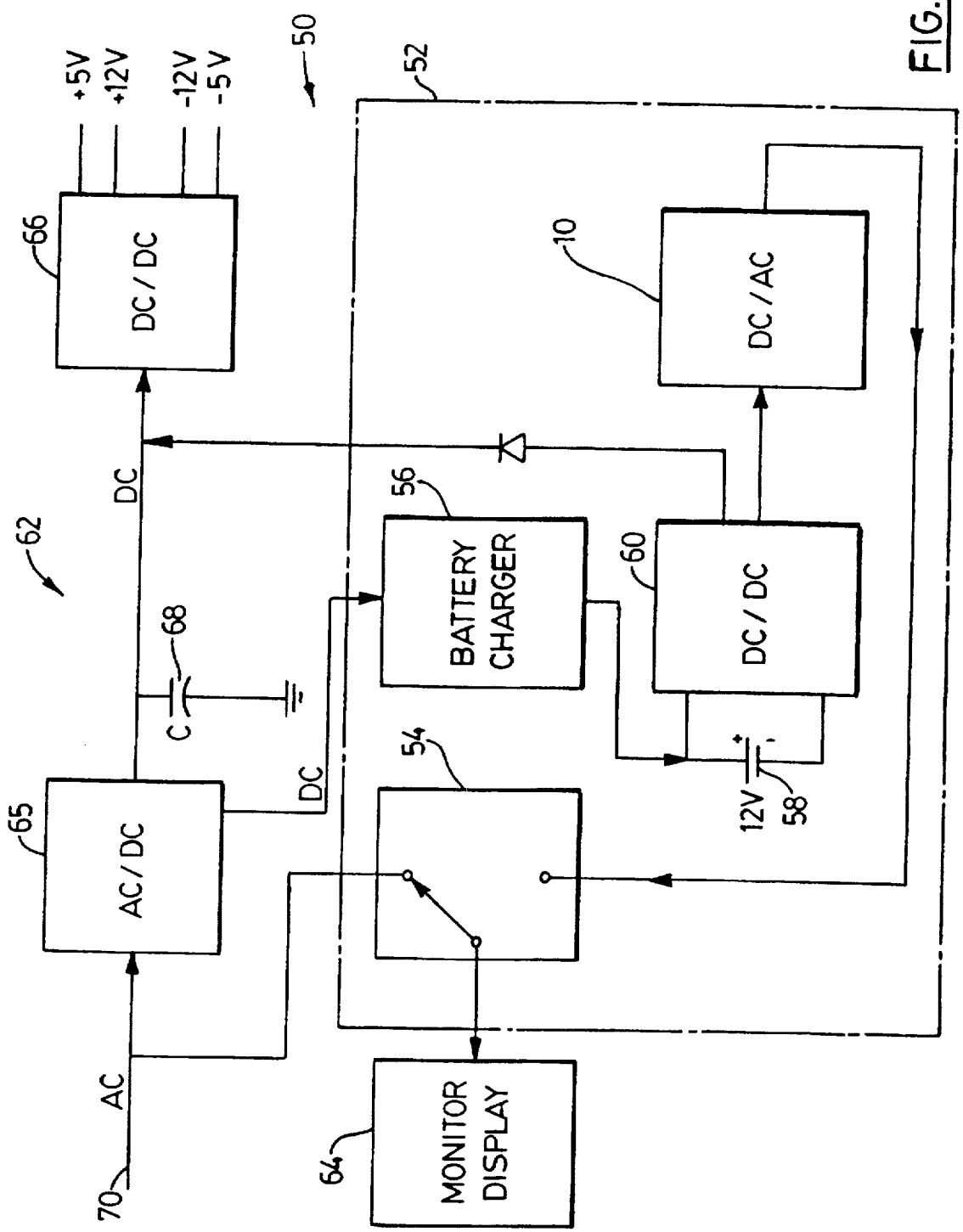

The inverter circuit according to the present invention does not comprise an iron core transformer and is therefore capable of being designed so that its size and weight are compatible for use in small type UPS systems. Safe and reliable inverter operation is not compromised since the power switch circuit 5 acts to protect the entire system. The power efficiency of the inverter circuit can be made very high (preferably up to approximately 96% to 98%), and therefore, in a preferred embodiment, the inverter circuit does not require a heat-sink or other device to remove heat from its components. The reduction in size of the UPS system allows it to be conveniently integrated or merged physically with any conventional switch power supply, such as a PS/2 supply commonly used for personal computers. The UPS system according to the present invention is small and compact enough to be fitted into the power supply housing for the device itself. This is particularly beneficial, in terms of the design and portability of the device, for UPS systems which provide at least partial on-line protection and which must be at least partly connected between the utility power line and the load. This concept is illustrated, by way of example, in FIG. 9a which shows an integrated UPS and power supply system 50 (the modules of which are shown in FIG. 9b) for a computer system 210 with a peripheral monitor 64. The circuitry for the UPS system, including an inverter according to the present invention, can be physically combined on the same board 51 as the circuitry for the power supply. For example, the housing of an integrated system 50 according to the present invention can be of a size: 150 millimetres in length by 150 millimetres in width by 85 millimetres in height (and with a printed circuit board 144 mm×105 mm×30 mm in size), or smaller (but not normally larger). This type of integration would not be possible for prior art UPS systems comprising inverters which use iron core transformers, without significantly increasing the size of the integrated device. It should also be noted that, although the integrated system 50 can be conveniently installed in or on an electronic device, in some instance it may be preferable to make the system 50 externally connectable, for instance when the power capacity of a device is high and correspondingly a large battery is needed in the UPS circuit.

FIG. 9b shows a block diagram which illustrates the basic concept of an integrated UPS and power supply system 50 designed to protect a personal computer system. The UPS system 52 generally comprises a relay 54, a battery charger 56, battery 58 (which may be 12 V battery suitable for a personal computer), a DC/DC converter 60, and an inverter 10 in accordance with the present invention. The power supply 62 principally comprises an AC/DC converter 65 and a DC/DC converter 66. The UPS system is connected through the relay 54 between the utility power line 70 and the load 64, which, in this particular case, comprises a computer monitor.

As shown in FIG. 9b, the integrated system continuously converts AC to DC power to continuously provide the computer with clean regulated DC voltage signals. The integrated system of FIG. 9a provides double conversion to both ±5 volts DC and ±12 volts DC. This form of on-line protection results in essentially a zero transfer time in the event of some sort of utility power failure or disruption. In the illustrated embodiment of FIG. 9b, the monitor is not backed up by on-line protection (this is not necessary since the transfer time of a few milliseconds, the switching time of the relay, is not visually perceptible to a human user). However, in an alternate embodiment the integrated system may provide complete on-line protection for a computer system or other electronic device.

Figure 10:
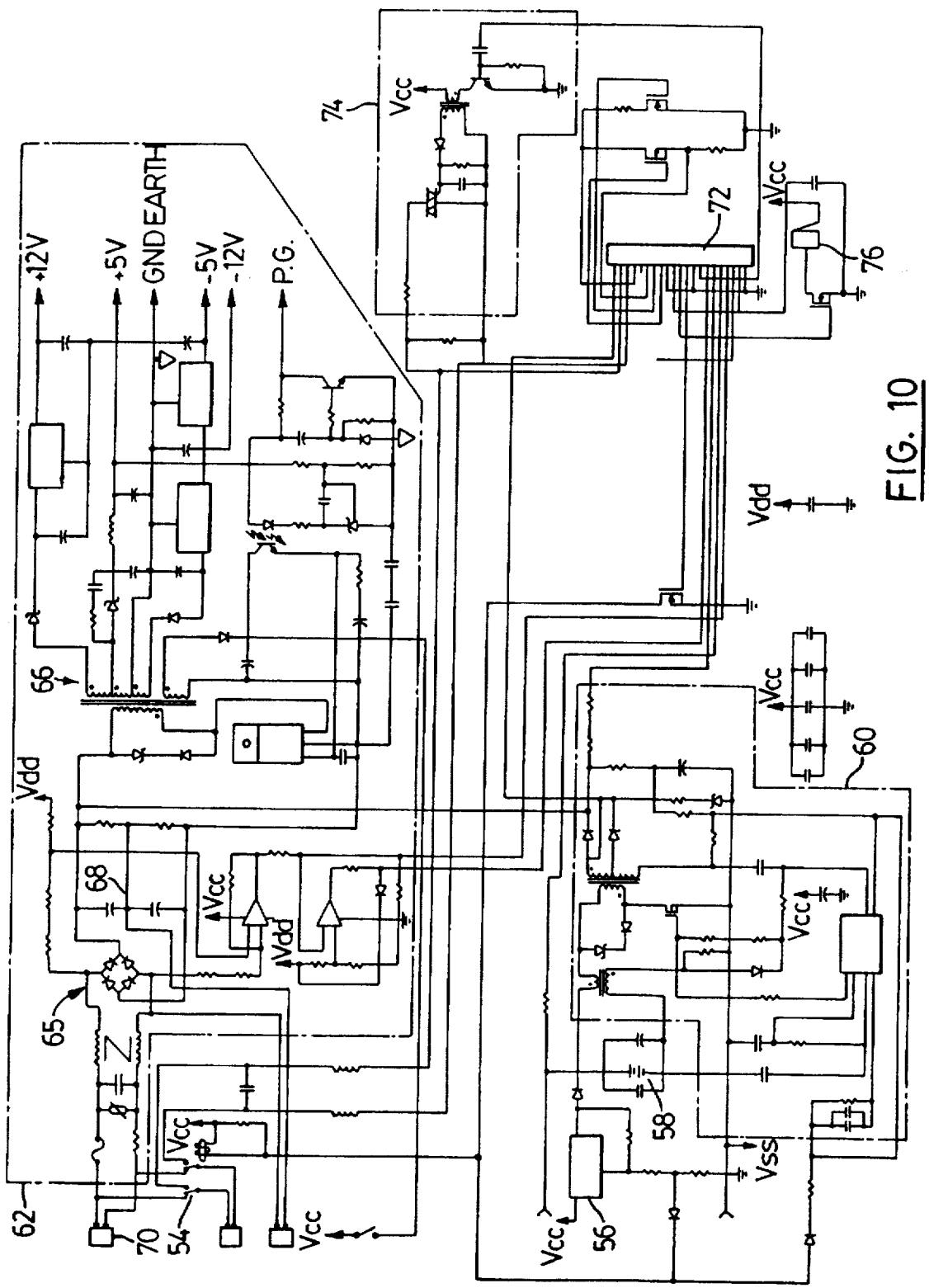
FIGS. 10 to 13 are detailed schematic circuit diagrams showing one implementation of an integrated UPS and power supply system.
Figure 11:
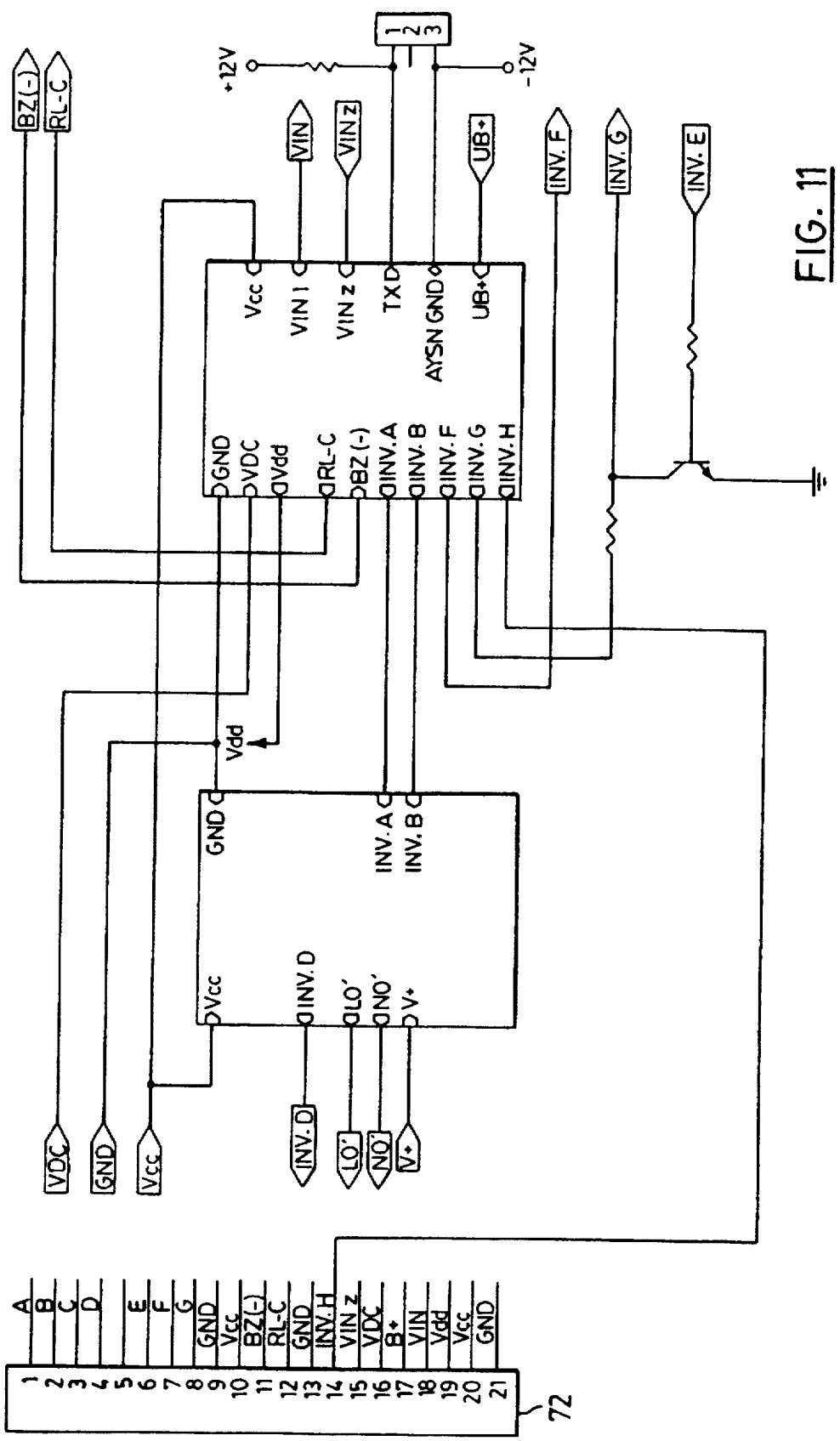
Figure 12:
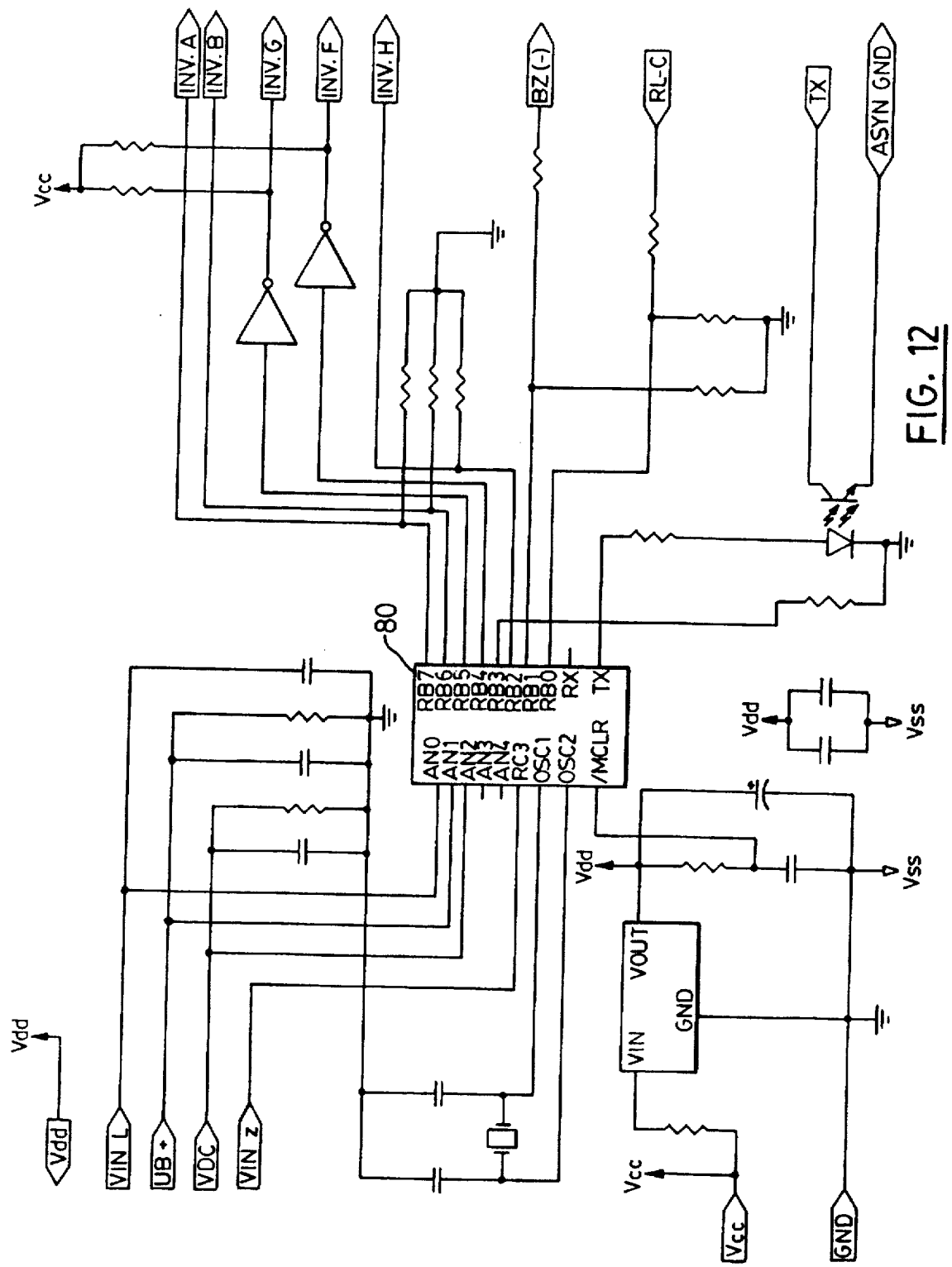
Figure 13:
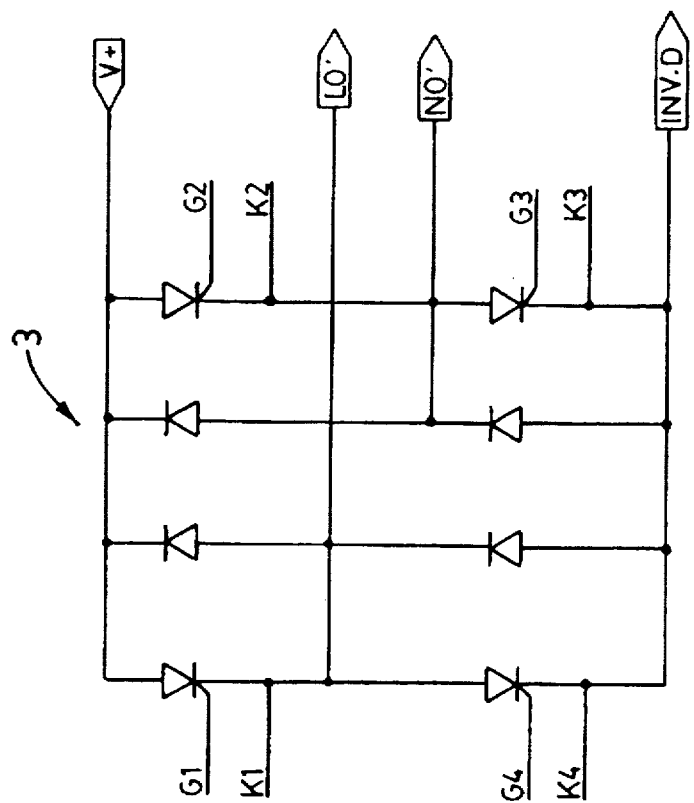
Figure 13:
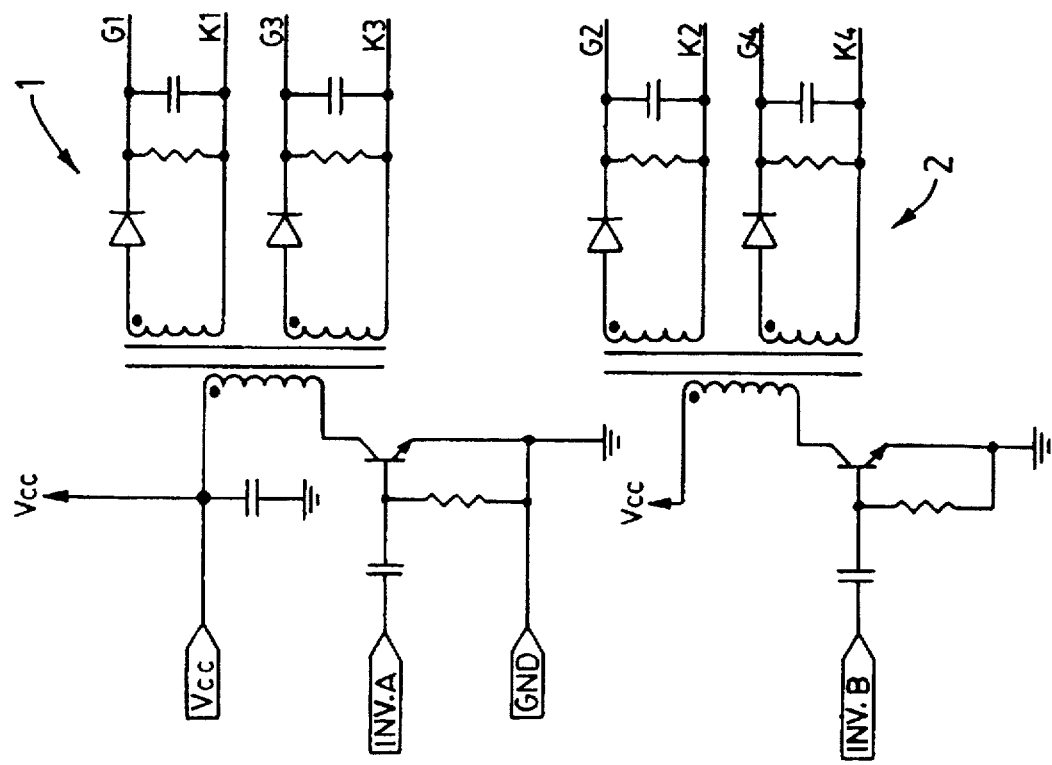

FIGS. 10 to 13 are schematic circuit diagrams showing a detailed implementation for the integrated UPS and power switch supply system 50 of FIG. 9a. The operation of FIGS. 10 to 13 will be well understood by those skilled in the art, and so these are described only briefly here. FIG. 12 shows the control block (including timing control) of the system comprising a microprocessor module 80. FIG. 13 shows the pulse control circuits 1 and 2 and the full-bridge circuit 3 of the inverter 10. FIG. 10 shows the remainder of the integrated UPS and power supply system including a standard power supply circuit 62, relay 54, converter 60, battery charger (voltage regulator) 56, and a 12 V battery 58. FIG. 10 also shows a circuit 74, a connector 72, and a buzzer device 76. Circuit 74 is an optional circuit designed to control the falling edge of the output signal, but which otherwise does not affect operation. FIG. 11 is a block diagram showing how FIG. 12, FIG. 13 and the connector 72 of FIG. 10 interconnect.

The microprocessor module 80 increases and monitors overall performance of the inverter and battery. It also manages power consumption, temperature and output voltage. When the system 50 is connected to a computer the microprocessor module 80 enables the system to communicate with the computer, and it can also be programmed to protect all unsaved data before automatically shutting down the computer safely. In one embodiment, the microprocessor module 80 also activates a continuous alarm when battery power is in use by sending an appropriate signal to the buzzer device 76. As the battery power becomes weaker the pitch of the alarm can be increased to inform the user to shut down the computer.

While preferred embodiments of the present invention have been described, the embodiments disclosed are illustrative and not restrictive, and the scope of the invention is intended to be defined only by the appended claims.

I claim:

1. An inverter circuit for converting a DC voltage between a first DC input and a second DC input into an AC voltage having first and second half cycles of opposite polarity across a load, said load being coupled between a first output terminal and a second output terminal, the inverter circuit comprising:

(a) a bridge circuit comprising a plurality of silicon controlled rectifier switches arranged in a bridge configuration, said bridge circuit being coupled between said first DC input and a first node, said bridge circuit further being coupled to said first output terminal and said second output terminal;

(b) a power switch circuit responsive to a third pulse signal and coupled between said first node and said second DC input, said power switch circuit including circuitry which provides overload and short circuit protection by limiting the magnitude of current through said load;

(c) a first pulse control circuit responsive to a first pulse signal and coupled to said bridge circuit for turning on a first portion of said bridge circuit;

(d) a second pulse control circuit responsive to a second pulse signal and coupled to said bridge circuit for turning on a second portion of said bridge circuit; and (e) a timing circuit coupled to said first and second pulse control circuits and to said power switch circuit for generating said first pulse signal for controlling said first pulse control circuit, said second pulse signal for controlling said second pulse control circuit, said first pulse signal and said second pulse signal being in phase opposition, and said third pulse signal for controlling said power switch circuit.

2. An inverter according to claim 1 wherein said bridge circuit comprises first, second, third, and fourth silicon controlled rectifier switches, said first silicon controlled rectifier switch being coupled between said first DC input and said first output terminal, said second silicon controlled rectifier switch being coupled between said first DC input and said second output terminal, said third silicon controlled rectifier switch being coupled between said first node and said second output terminal, and said fourth silicon controlled rectifier switch being coupled between said first node and said first output terminal.

3. An inverter according to claim 2 wherein said first portion of said bridge circuit comprises said first silicon controlled rectifier switch and said third silicon controlled rectifier switch, and said second portion of said bridge comprises said second silicon controlled rectifier switch and said fourth silicon controlled rectifier switch.

4. An inverter according to claim 3 wherein the anode of said first silicon controlled rectifier switch and the anode of said second silicon controlled rectifier switch are each connected to said first DC input, the anode of said third silicon controlled rectifier switch is connected to said second output terminal, and the anode of said fourth silicon controlled rectifier switch is connected to said first output terminal.

5. An inverter according to claim 3 or 4 wherein each of said first, second, third, and fourth silicon controlled rectifier switches is connected in parallel with a diode, such that the anode of the diode is connected to the cathode of the silicon controlled rectifier and the cathode of the diode is connected to the anode of the silicon controlled rectifier.

6. An inverter according to claim 3 wherein said inverter comprises an inductance coupled between said first node and said power switch circuit.

7. An inverter according to claim 6 wherein said inverter includes a diode having a first terminal coupled to said power switch circuit and a second terminal coupled to said first DC input.

8. An inverter according to claim 3, wherein said first output terminal is coupled to said first switch and to said fourth switch through a first inductor and said second output terminal is coupled to said second switch and to said third switch through a second inductor.

9. An inverter according to claim 3, 6, or 8 wherein a capacitor is coupled between said first output terminal and said second output terminal.

10. An inverter according to claim 1, wherein each of said first pulse control circuit and said second pulse control circuit comprises a transformer having one primary winding with first and second terminals, a first secondary winding with first and second terminals, and a second secondary winding with first and second terminals, such that:

the first terminal of said primary winding is connected to a first reference signal, the second terminal of said primary winding is coupled through a switching circuit to a second reference signal, said switching circuit being responsive to a pulse signal for generating a pulse of a first polarity across said primary winding;

the first terminal of said first secondary winding is connected through a first diode to a first terminal of a first capacitor and a first terminal of a first resistor and the second terminal of said first secondary winding is connected to a second terminal of said first capacitor and a second terminal of said first resistor, so that an output pulse is generated between the first terminal and the second terminal of said first resistor in response to said pulse across said primary winding; and the first terminal of said second secondary winding is connected through a second diode to a first terminal of a second capacitor and a first terminal of a second resistor and the second terminal of said second secondary winding is connected to a second terminal of said second capacitor and a second terminal of said second resistor, so that an output pulse is generated between the first terminal and the second terminal of said second resistor in response to said pulse across said primary winding.

11. An inverter according to claim 10, wherein said first diode and said second diode are configured to isolate said first secondary winding from said first capacitor and from said first resistor and to isolate said second secondary winding from said second capacitor and from said second resistor when said pulse across said primary winding is not of said first polarity.

12. An inverter according to claim 1, wherein said power switch circuit comprises a power transistor, the drain of said power transistor being connected to said bridge circuit, the source of said power transistor being connected to said second DC input, and the gate of said transistor being coupled to said third pulse signal.

13. An inverter according to claim 1, wherein said power switch circuit comprises:

(a) a first power transistor having a source, gate and drain, the drain of said first power transistor being connected to said bridge circuit, and the gate of said first power transistor being coupled through a first resistor to said third pulse signal;

(b) a second power transistor having a source, gate and drain, the gate of said second power transistor being coupled to said third pulse signal and the source of said second power transistor being coupled to the source of said first power transistor;

(c) a third transistor having a base;

(d) a second resistor coupled between the source of said first power transistor and the base of said third transistor;

(e) a third resistor coupled between the source of said second power transistor and the second DC input for detecting the magnitude of the current between said first output terminal and said second output terminal; and (f) a fourth resistor coupled between the drain of said first power transistor and the drain of said second power transistor for limiting the magnitude of said current between said first output terminal and said second output terminal when said magnitude exceeds a threshold value.

14. An inverter circuit for generating an AC voltage having first and second half cycles of opposite polarity and having a wave form of a certain shape, said inverter circuit converting a DC voltage between a first DC input and a second DC input into said AC voltage across a load, said load being coupled between a first output terminal and a second output terminal, said inverter circuit comprising:

(a) a bridge circuit comprising a plurality of silicon controlled rectifier switches arranged in a bridge configuration, said bridge circuit being coupled between said first DC input and a first node, said bridge circuit further being coupled to said first output terminal and said second output terminal;

(b) a power switch circuit responsive to a third pulse signal and coupled between said first node and said second DC input, said power switch circuit including circuitry which provides overload and short circuit protection by limiting the magnitude of current through said load;

(c) a first pulse control circuit responsive to a first pulse signal and coupled to said bridge circuit for turning on a first portion of said bridge circuit;

(d) a second pulse control circuit responsive to a second pulse signal and coupled to said bridge circuit for turning on a second portion of said bridge circuit;

(e) a timing circuit coupled to said first and second pulse control circuits and to said power switch circuit for generating said first pulse signal for controlling said first pulse control circuit, said second pulse signal for controlling said second pulse control circuit, said first pulse signal and said second pulse signal being in phase opposition, and said third pulse signal for controlling said power switch circuit;

(f) a circuit for providing a standard signal in the shape of said wave form;

(g) said inverter circuit being configured such that said first pulse signal pulses high and said second pulse signal remains low during the first half cycle of said standard signal; said second pulse signal pulses high and said first pulse signal remains low during the second half cycle of said standard signal; said third pulse signal pulses high if the value of said AC voltage is less than the value of said standard signal; and said third pulse signal remains low if the value of said AC voltage is greater than the value of said standard signal.

15. A method of using an inverter circuit to generate an AC voltage having first and second half cycles of opposite polarity and having a wave form of a certain shape, said inverter circuit converting a DC voltage between a first DC input and a second DC input into said AC voltage across a load, said load being coupled between a first output terminal and a second output terminal, said inverter circuit comprising:

a bridge circuit comprising a plurality of silicon controlled rectifier switches arranged in a bridge configuration, said bridge circuit being coupled between said first DC input and a first node, said bridge circuit further being coupled to said first output terminal and said second output terminal;

a power switch circuit responsive to a third pulse signal and coupled between said first node and said second DC input, said power switch circuit including circuitry which provides overload and short circuit protection by limiting the magnitude of current through said load;

a first pulse control circuit responsive to a first pulse signal and coupled to said bridge circuit for turning on a first portion of said bridge circuit;

a second pulse control circuit responsive to a second pulse signal and coupled to said bridge circuit for turning on a second portion of said bridge circuit; and a timing circuit coupled to said first and second pulse control circuits and to said power switch circuit for generating a first pulse signal for controlling said first pulse control circuit, a second pulse signal for controlling said second pulse control circuit, said first pulse signal and said second pulse signal being in phase opposition, and said third pulse signal for controlling said power switch circuit;

said method comprising the steps of:

(a) providing a standard signal in the shape of said wave form;

(b) pulsing said first pulse signal high and maintaining said second pulse signal low during the first half cycle of said standard signal;

(c) pulsing said second pulse signal high and maintaining said first pulse signal low during the second half cycle of said standard signal;

(d) pulsing said third pulse signal high if the value of said AC voltage is less than the value of said standard signal; and (e) maintaining said third pulse signal low if the value of said AC voltage is greater than the value of said standard signal.

16. A method of using an inverter circuit to generate an AC voltage having first and second half cycles of opposite polarity and having a wave form of a certain shape, said inverter circuit converting a voltage between a first input and a second input into said AC voltage across a load, said load being coupled between a first output terminal and a second output terminal, said inverter circuit comprising:

a bridge circuit comprising a plurality of silicon controlled rectifier switches arranged in a bridge configuration, said bridge circuit being coupled between said first DC input and a first node, said bridge circuit further being coupled to said first output terminal and said second output terminal;

a power switch circuit responsive to a third pulse signal and coupled between said first node and said second DC input, said power switch circuit including circuitry which provides overload and short circuit protection by limiting the magnitude of current through said load;

a first pulse control circuit responsive to a first pulse signal and coupled to said bridge circuit for turning on a first portion of said bridge circuit;

a second pulse control circuit responsive to a second pulse signal and coupled to said bridge circuit for turning on a second portion of said bridge circuit; and a timing circuit coupled to said first and second pulse control circuits and to said power switch circuit for generating a first pulse signal for controlling said first pulse control circuit, a second pulse signal for controlling said second pulse control circuit, said first pulse signal and said second pulse signal being in phase opposition, and said third pulse signal for controlling said power switch circuit;

said method comprising the steps of:

(a) providing a standard signal in the shape of said wave form;

(b) providing a fully rectified signal at one of said first input or said second input and providing a DC input at the other of said first input or said second input;

(c) pulsing said first pulse signal high and maintaining said second pulse signal low during the first half cycle of a standard signal;

(d) pulsing said second pulse signal high and maintaining said first pulse signal low during the second half cycle of said standard signal;

(e) pulsing said third pulse signal low so as to turn said power switch off during periods between a pulse of said first pulse signal and a pulse of said second pulse signal;

(f) increasing the amplitude of said fully rectified signal if the value of said AC voltage is less than the value of said standard signal; and (g) decreasing the amplitude of said fully rectified signal if the value of said AC voltage is greater than the value of said standard signal;

such that said fully rectified signal resembles a signal in the shape of said wave form which has been fully rectified.

17. An integrated uninterruptible power supply (UPS) and power supply system for protecting a portable device from disruptions in utility AC power, said portable device having a power supply circuit installed thereon for receiving utility AC power, said integrated UPS and power supply system comprising said power supply circuit and an uninterruptible power supply system circuit, said uninterruptible power supply system circuit comprising a battery and an inverter circuit, said inverter circuit not having an iron core transformer and being of small size.

18. An integrated power supply system according to claim 17 wherein said inverter circuit of said uninterruptible power supply system converts a DC voltage between a first DC input and a second DC input into an AC voltage having first and second half cycles of opposite polarity across a load, said load being coupled between a first output terminal and a second output terminal, said inverter circuit comprising:

(a) a bridge circuit comprising a plurality of silicon controlled rectifier switches arranged in a bridge configuration, said bridge circuit being coupled between said first DC input and a first node, said bridge circuit further being coupled to said first output terminal and said second output terminal;

(b) a power switch circuit responsive to a third pulse signal and coupled between said first node and said second DC input, said power switch circuit including circuitry which provides overload and short circuit protection by limiting the magnitude of current through said load;

(c) a first pulse control circuit responsive to a first pulse signal and coupled to said bridge circuit for turning on a first portion of said bridge circuit;

(d) a second pulse control circuit responsive to a second pulse signal and coupled to said bridge circuit for turning on a second portion of said bridge circuit; and (e) a timing circuit coupled to said first and second pulse control circuits and to said power switch circuit for generating a first pulse signal for controlling said first pulse control circuit, a second pulse signal for controlling said second pulse control circuit, said first pulse signal and said second pulse signal being in phase opposition, and said third pulse signal for controlling said power switch circuit.

19. An integrated power supply system according to claim 18 wherein said bridge circuit comprises first, second, third, and fourth silicon controlled rectifier switches, said first silicon controlled rectifier switch being coupled between said first DC input and said first output terminal, said second silicon controlled rectifier switch being coupled between said first DC input and said second output terminal, said third silicon controlled rectifier switch being coupled between said first node and said second output terminal, and said fourth silicon controlled rectifier switch being coupled between said first node and said first output terminal.

20. An integrated power supply system according to claim 19 wherein said first portion of said bridge circuit comprises said first silicon controlled rectifier switch and said third silicon controlled rectifier switch, and said second portion of said bridge comprises said second silicon controlled rectifier switch and said fourth silicon controlled rectifier switch.

21. An integrated power supply system according to any of claims 18 to 20 and being installed within said device, said device being a computer.

22. An inverter circuit according to claim 1 wherein said inverter circuit does not comprise an iron core transformer and is of small size.

23. An inverter according to claim 9 wherein said load comprises a rectifying circuit.

24. An inverter according to claim 9 wherein said load has an impedance such that a stable current is maintained through said load when either the first portion or the second portion of said bridge circuit is on.

25. An inverter according to claim 13 wherein the duration of the leading edge of a half cycle of said AC voltage is determined at least in part by said third resistor and said second power transistor.

* * * * *